US008927064B2

(12) United States Patent
Mori et al.

(10) Patent No.: US 8,927,064 B2
(45) Date of Patent: Jan. 6, 2015

(54) COATING AGENT FOR TAPPING SCREW, METHOD FOR PREPARING THE COATING AGENT, METHOD FOR FORMING COATING LAYER ON THE PERIPHERY OF TAPPING SCREW USING THE COATING AGENT, AND TAPPING SCREW HAVING COATING LAYER FORMED FROM THE COATING AGENT

(75) Inventors: Shigeto Mori, Chigasaki (JP); Yousuke Okamura, Hadano (JP); Mayumi Matsuno, Hadano (JP)

(73) Assignee: Topura Co., Ltd. (JP)

( * ) Notice: Subject to any disclaimer, the term of this patent is extended or adjusted under 35 U.S.C. 154(b) by 774 days.

(21) Appl. No.: 12/444,602

(22) PCT Filed: Oct. 4, 2007

(86) PCT No.: PCT/JP2007/069903
§ 371 (c)(1),
(2), (4) Date: Apr. 7, 2009

(87) PCT Pub. No.: WO2008/044751
PCT Pub. Date: Apr. 17, 2008

(65) Prior Publication Data
US 2010/0034615 A1     Feb. 11, 2010

(30) Foreign Application Priority Data
Oct. 11, 2006 (JP) .................. 2006-277411

(51) Int. Cl.
*B05D 1/18* (2006.01)
(Continued)

(52) U.S. Cl.
CPC .............. *F16B 33/06* (2013.01); *C10M 173/02* (2013.01); *C10M 2201/085* (2013.01);
(Continued)

(58) Field of Classification Search
CPC ................ C10M 2201/02; C10M 2201/085; C10M 2207/1203; C10M 2209/084; F16B 33/06; F16B 25/00

USPC ................ 427/372.2, 435; 524/538; 525/437; 411/378
See application file for complete search history.

(56) References Cited

U.S. PATENT DOCUMENTS 1,976,305 A * 10/1934 Swanson et al. ............... 411/378
2,181,835 A * 11/1939 Place .......................... 524/575.5
(Continued)

FOREIGN PATENT DOCUMENTS

JP   2000-144167 A   5/2000
JP   2002-70824 A    3/2002
(Continued)

OTHER PUBLICATIONS

International Search Report issued in corresponding PCT/JP2007/069903, dated Dec. 25, 2007.
(Continued)

*Primary Examiner* — Gay Ann Spahn
(74) *Attorney, Agent, or Firm* — Rossi, Kimms & McDowell LLP

(57) ABSTRACT

Provided are a coating agent capable of forming, on the periphery of a tapping screw, a coating layer which can hold female-thread-forming chips generated during screwing of the tapping screw into a prepared hole of a workpiece, thereby preventing scattering of the female-thread-forming chips; and a tapping screw having thereon a coating layer formed from the coating agent.
The coating agent is a composition containing, as primary components, calcium montanate or a calcium-montanate-containing montanic acid species mixture, a thermoplastic resin emulsion, and water. The coating agent can form, on the periphery of a tapping screw, a coating layer which exhibits a lubricating function, and a function of capturing female-thread-forming chips.

7 Claims, 2 Drawing Sheets

(51) Int. Cl.
*C08G 69/26* (2006.01)
*C08G 63/00* (2006.01)
*F16B 33/06* (2006.01)
*C10M 173/02* (2006.01)
*F16B 25/00* (2006.01)

(52) U.S. Cl.
CPC .. *C10M 2207/1203* (2013.01); *C10M 2201/02* (2013.01); *C10M 2209/084* (2013.01); *F16B 25/00* (2013.01)
USPC ........ 427/372.2; 427/435; 524/538; 525/437; 411/378

(56) References Cited

U.S. PATENT DOCUMENTS

| | | | |
|---|---|---|---|
| 5,093,419 A * | 3/1992 | Kodama et al. | 525/64 |
| 5,221,170 A * | 6/1993 | Duffy et al. | 411/428 |
| 6,007,286 A * | 12/1999 | Toyota et al. | 411/428 |
| 2002/0037400 A1* | 3/2002 | Fujiwara et al. | 428/330 |
| 2004/0254280 A1* | 12/2004 | Richter et al. | 524/400 |
| 2005/0038153 A1* | 2/2005 | Richter et al. | 524/275 |
| 2006/0263394 A1* | 11/2006 | Oyama et al. | 424/400 |
| 2006/0287419 A1* | 12/2006 | Park et al. | 524/277 |
| 2007/0088113 A1* | 4/2007 | Suzuki et al. | 524/404 |
| 2007/0111909 A1* | 5/2007 | Combetta | 508/450 |
| 2007/0117897 A1* | 5/2007 | Onda et al. | 524/394 |
| 2007/0161727 A1* | 7/2007 | Kobayashi et al. | 524/200 |
| 2007/0196632 A1* | 8/2007 | Meyer et al. | 428/212 |
| 2009/0053489 A1* | 2/2009 | Yamamura et al. | 428/213 |
| 2009/0169844 A1* | 7/2009 | Yamamura et al. | 428/213 |
| 2009/0312468 A1* | 12/2009 | Tsunoda et al. | 524/130 |
| 2010/0160505 A1* | 6/2010 | Kumazawa et al. | 524/112 |
| 2011/0014486 A1* | 1/2011 | Sakamoto et al. | 428/474.4 |

FOREIGN PATENT DOCUMENTS

| | | |
|---|---|---|
| JP | 2002-257120 A | 9/2002 |
| JP | 2002-257121 A | 9/2002 |
| JP | 2002-295430 A | 10/2002 |
| JP | 2005-290112 A | 10/2005 |
| JP | 2006-183825 A | 7/2006 |

OTHER PUBLICATIONS

Extended European Search Report issued in corresponding European Patent Application No. 07849901.9 dated Nov. 18, 2010.

* cited by examiner

COATING AGENT FOR TAPPING SCREW, METHOD FOR PREPARING THE COATING AGENT, METHOD FOR FORMING COATING LAYER ON THE PERIPHERY OF TAPPING SCREW USING THE COATING AGENT, AND TAPPING SCREW HAVING COATING LAYER FORMED FROM THE COATING AGENT

This application is a U.S. National Phase Application of PCT International Application PCT/JP2007/069903 filed on Oct. 4, 2007 which is based on and claims priority from JP 2006-277411 filed on Oct. 11, 2006, the contents of which is incorporated herein in its entirety by reference.

TECHNICAL FIELD

The present invention relates to an agent for forming a coating layer on a tapping screw (hereinafter the agent may be referred to as a "(tapping screw) coating agent"); to a method for preparing the coating agent; to a method for forming a coating layer so as to cover the periphery of a tapping screw by use of the coating agent; and to a tapping screw having thereon a coating layer formed from the coating agent. As used herein, the term "tapping screw" collectively refers to screws which allow self-tapping.

BACKGROUND ART

In a method for mounting various parts on a workpiece with tapping screws, the tapping screws are screwed into prepared holes formed in the workpiece while tapping female threads, so that the parts are supported between the workpiece and the heads of the tapping screws. Such a mounting method is generally employed for, for example, mounting small parts of an electronic device on a workpiece. When the mounting method is employed, attention must be paid to the treatment of powdery chips (i.e., forming chips) generated during screwing of a tapping screw into a prepared hole of a workpiece. In the mounting method, when a tapping screw is screwed into a prepared hole of a workpiece, as the tapping screw enters the prepared hole, a female thread is gradually formed at the inner wall of the prepared hole, whereby shavings are continuously generated through formation of the female thread. The shavings are scraping of the material of the workpiece. The thus-generated shavings may be scattered and deposited on a part to be mounted or on the workpiece. The shavings deposited on the part or the workpiece may adversely affect other parts mounted on the workpiece. When, for example, an electronic circuit or a similar part is mounted on the workpiece, scattering of chips generated during formation of a female thread (hereinafter the chips may be referred to as "female-thread-forming chips") may cause short-circuit of the electronic circuit, resulting in, for example, breakage or burnout of devices.

In order to solve such a problem, scattering of female-thread-forming chips, which are continuously generated during screwing of a tapping screw into a prepared hole of a workpiece, must be prevented through specific means, thereby preventing deposition of the female-thread-forming chips on parts or the workpiece. A tapping screw having means for preventing deposition of female-thread-forming chips on parts or a workpiece has been proposed and disclosed in, for example, Japanese Patent Application Laid-Open (kokai) No. 2002-70824 (Patent Document 1), No. 2002-257120 (Patent Document 2), or No. 2002-257121 (Patent Document 3).

The tapping screws proposed in the aforementioned patent documents include a male threaded portion (i.e., shank) having, on the periphery thereof, a coating layer. The coating layer is formed through application of a resin adhesive agent containing microcapsules encapsulating an epoxy adhesive, or application of a coating material containing microcapsules encapsulating an absorbent/adsorbent having a viscosity of 40 to 100 cP as a primary component. However, none of these patent documents describes an effective component for forming such a coating layer; i.e., base components constituting the coating layer are not disclosed in detail.

In a tapping screw having thereon a coating layer formed from a resin adhesive agent whose components are partially specified, the coating layer is formed from a resin adhesive agent containing densely dispersed microcapsules encapsulating an epoxy adhesive. When the tapping screw is screwed into a prepared hole of a workpiece, the microcapsules are broken by pressure applied thereto during formation of a female thread, and the coating layer may exhibit an adhesion effect on female-thread-forming chips. Thus, by virtue of its adhesion effect exerted under application of pressure during formation of the female thread, the coating layer may hold female-thread-forming chips generated during screwing of the tapping screw; i.e., the coating layer may function so as to prevent scattering of female-thread-forming chips on parts or the workpiece.

However, as described above, none of the aforementioned patent documents discloses components of a coating layer (in particular, an effective component for forming the coating layer) formed on the periphery of a male threaded portion (i.e., shank) of a tapping screw. Therefore, it is absolutely unclear whether or not the coating layer sufficiently exhibits the aforementioned function of capturing female-thread-forming chips when the tapping screw is screwed into a prepared hole of a workpiece. In addition, the coating layer is required to have the following characteristics for exhibiting the function of capturing female-thread-forming chips.

Firstly, the coating layer is required to have a characteristic such that it is strongly bonded to the periphery of the shank of the tapping screw and is never removed therefrom until completion of screwing of the tapping screw into the prepared hole of the workpiece. Secondly, the coating layer is required to have a characteristic such that it expresses its potential adhesive function at a desired timing by means of pressure applied thereto during gradual formation of a female thread until completion of screwing of the tapping screw into the prepared hole of the workpiece. Thirdly, the coating layer is required to have a characteristic such that it exhibits a lubricating function to such an extent that the tapping screw can be smoothly screwed into the prepared hole of the workpiece under a predetermined operation load. Regarding these characteristics, the coating layer formed from the aforementioned resin adhesive agent containing densely dispersed microcapsules encapsulating an epoxy adhesive poses problems described below.

Since components of such a coating agent for forming the coating layer are not disclosed in detail, the adhesion strength of the coating layer to the shank of the tapping screw cannot be evaluated. However, the adhesion strength of the coating layer is not considered in the aforementioned patent documents. Thus the coating layer cannot be regarded as having the aforementioned first characteristic.

It is asserted that the coating agent for forming the coating layer is a resin adhesive agent containing densely dispersed microcapsules encapsulating an epoxy adhesive. On the basis of this assertion, the coating agent is thought to be prepared by, for example, dispersing numerous epoxy-adhesive-containing microcapsules in a resin emulsion as an effective coating component. In the coating agent, the size of resin particles of the resin emulsion which is an effective coating component is as small as about 0.01 μm, whereas the size of microcapsules is very large (i.e., 1 μm or more). Therefore, the coating agent poses a problem in that a large number of microcapsules cannot be uniformly dispersed in the resultant coating layer; i.e., the microcapsules are not uniformly distributed over the surface of a metallic member to which the coating layer is bonded.

In view of the relationship between the microcapsule size and the size of resin particles of the emulsion, the thickness of a coating layer formed must be increased. However, when a thick coating layer is formed on a tapping screw, the coating layer is likely to separate from the screw in an early stage of screwing of the screw into a prepared hole of a workpiece; i.e., the coating layer cannot maintain strong adhesion to the screw until completion of screwing of the screw into the prepared hole of the workpiece.

In addition, when such a thick coating layer is formed on a tapping screw, progress of breakage of microcapsules contained in the coating layer does not keep up with the rate of screwing of the tapping screw in a prepared hole of a workpiece (i.e., the rate of formation of a female thread). Thus, the coating layer cannot achieve expression of its potential adhesive function at a desired timing by means of pressure applied thereto upon formation of a female thread until completion of screwing of the tapping screw into the prepared hole of the workpiece. That is, since the coating layer does not have the aforementioned second characteristic, the coating layer cannot exhibit the function of capturing female-thread-forming chips (chips produced during formation of a female thread) at a desired timing, and scattering of the chips is inevitable.

Also, use of a lubricant in the aforementioned coating agent, whose components are not described in detail, is not disclosed. In addition, no attention is paid to the lubricating function required for a coating layer between the male threaded portion of a tapping screw and the inner wall of a prepared hole of a workpiece during formation of a female thread. Therefore, the coating layer cannot be regarded as having the aforementioned third characteristic.

In view of the foregoing, a main object of the present invention is to provide a coating agent capable of forming a coating layer which has at least the aforementioned three characteristics, and which functions so as to prevent scattering of female-thread-forming chips generated during formation of a female thread through screwing of a tapping screw into a prepared hole of a workpiece. Another object of the present invention is to provide a method for forming the coating layer on the periphery of a tapping screw by use of the coating agent. Yet another object of the present invention is to provide a tapping screw having thereon the coating layer (hereinafter the tapping screw may be referred to as a "coated tapping screw").

DISCLOSURE OF THE INVENTION

The present invention is directed to a tapping screw coating agent; to a method for preparing the coating agent; to a method for forming a coating layer on the periphery of a tapping screw by use of the coating agent; and to a tapping screw having thereon a coating layer formed from the coating agent.

The present invention provides a tapping screw coating agent for forming, on the periphery of a tapping screw, a coating layer exhibiting a lubricating function and a function of capturing female-thread-forming chips, characterized in that the coating agent is a composition comprising, as primary components, calcium montanate or a calcium-montanate-containing montanic acid species mixture, a thermoplastic resin emulsion, and water, wherein the amount of calcium montanate or the montanic acid species mixture is 3 to 20 wt. %, and the amount of the thermoplastic resin emulsion is 1 to 10 wt. % as a solid content.

As used herein, "calcium montanate or a calcium-montanate-containing montanic acid species mixture," which is a component of the coating agent of the present invention, refers to, for example, calcium montanate, a calcium salt produced from a mixture of montanic acid and a montanic acid ester, or a mixture of calcium montanate and a montanic acid ester. Hereinafter, the term "calcium montanate" may collectively refer to these species.

In the tapping screw coating agent of the present invention, the thermoplastic resin emulsion, which is a component of the coating agent, preferably contains a resin having a glass transition point of 50° C. or lower. In preparation of the coating agent, a surfactant for dispersing calcium montanate in water is used. The coating agent preferably contains a surfactant in an amount equal to or greater than that required for dispersing calcium montanate in water. In this case, the surfactant content of the coating agent is preferably 1 to 9 wt. %. The coating agent preferably contains a pigment. The pigment content of the coating agent is preferably 0.1 to 0.5 wt. %.

The present invention also provides a method for forming a coating layer on a tapping screw; i.e., a method for forming a coating layer on the periphery of a tapping screw by use of the coating agent of the present invention, characterized in that the method comprises immersing numerous tapping screws placed in an immersing container in a coating agent having a temperature adjusted to 10 to 30° C. and a viscosity adjusted to 3 to 13 mPa·S (at 25° C.); removing an excessive amount of the coating agent deposited on each tapping screw after completion of immersion; and drying the coating agent deposited on each tapping screw, to thereby form a coating layer on the periphery of the tapping screw.

The present invention also provides a tapping screw having thereon a coating layer formed by applying the coating agent of the present invention to the tapping screw through immersion, characterized in that the tapping screw has a coating layer of virtually uniform thickness on the entirety of a shank of the screw, which is a male threaded portion, and on the entirety of a head of the screw, which is united with the shank, wherein the coating layer exhibits a lubricating function during screwing of the tapping screw, and a function of capturing female-thread-forming chips generated through screwing of the tapping screw. In the tapping screw, the coating layer formed on the entirety thereof preferably has a thickness of 1 to 6 μm. The coating layer formed on the entirety of the tapping screw preferably assumes a color different from that of the material of the tapping screw.

When the coated taping screw having thereon a coating layer formed from the coating agent of the present invention is employed for, for example, fixing a part on a workpiece, the tapping screw is screwed into a prepared hole provided in the workpiece. When the tapping screw is employed in such a manner, since the coating layer formed on the periphery of the tapping screw has small thickness and high adhesion strength, the coating layer is not removed away from the shank, which is male threaded portion, of the tapping screw until completion of screwing of the tapping screw into the prepared hole. In addition, the coating layer exhibits a proper lubricating function during screwing of the tapping screw, and also exhibits a proper function of capturing female-thread-forming chips through expression of the adhesive function of the coating layer by means of pressure and heat applied thereto during formation of a female thread during screwing.

Thus, by virtue of the lubricating function of the coating layer, the coated tapping screw of the present invention is screwed into a prepared hole of a workpiece under a virtually consistent load; i.e., screwing of the tapping screw can be smoothly carried out. Further, female-thread-forming chips generated during formation of a female thread during screwing of the tapping screw are held, at a desired timing, in the coating layer by its adhesive function that is expressed by means of pressure and heat applied to the coating layer during formation of the female thread. Therefore, scattering of female-thread-forming chips on mounted parts or the workpiece is reliably prevented. Thus, employment of the tapping screw can prevent scattering of female-thread-forming chips, and can avoid adverse effects of female-thread-forming chips on the mounted parts or the workpiece.

Calcium montanate contained in the coating agent of the present invention functions so that a coating layer formed from the coating agent exhibits lubricity. As compared with, for example, calcium stearate (calcium soap), which is generally employed as a lubricant, calcium montanate exhibits strong waxy characteristics and excellent adhesion to the surface of a metallic member. Therefore, employment of calcium montanate, which serves as a lubricant, can considerably reduce the amount of the thermoplastic resin emulsion employed, which serves as a binder for attaining strong adhesion of a coating layer to the surface of a tapping screw. This is the reason why the coating agent of the present invention can form a thin coating layer which is strongly bonded to the peripheral surface of a tapping screw.

The thermoplastic resin emulsion, which is a component of the coating agent of the present invention, serves as a binder for bonding calcium montanate which is an effective coating component to the surface of a tapping screw. Also the thermoplastic resin emulsion functions so as to hold shavings generated during formation of a female thread. Therefore, the resin contained in the emulsion must have excellent capturing performance and adhesion. The coating agent of the present invention employs, as the resin constituting the thermoplastic resin emulsion, a thermoplastic resin having a glass transition point of 50° C. or lower. When a resin having high glass transition point or a thermosetting resin is employed, a coating layer formed from the resultant coating agent exhibits high hardness, resulting in an increase in friction coefficient and impairment of the function of capturing female-thread-forming chips. In order to avoid such a problem, the present invention employs a thermoplastic resin having a glass transition point of 50° C. or lower.

Thus, a coating layer formed from the coating agent is prevented from melting in an atmosphere at about 80° C., and can exhibit the function of capturing shavings generated during formation of a female thread. In addition, when, for example, a tapping screw having the coating layer is employed for mounting parts on a workpiece, thereby producing a device, the coating layer is prevented from melting at high temperature in the produced device, and also prevented from falling from the tapping screw. In this regard, the resin employed in the coating agent is preferably an acrylic resin.

When the coating agent of the present invention is prepared, a surfactant is used for dispersing calcium montanate in water. When the surfactant is incorporated into the coating agent in an amount equal to or in excess of that required for dispersing calcium montanate in water, the excess portion of the surfactant serves as a leveling agent for improving applicability of the coating agent (i.e., the ability of the agent to be uniformly applied), thereby reducing irregularities of the resultant coating layer.

Therefore, since such an excess surfactant present in the coating agent serves as a leveling agent, a more uniform and thinner coating layer can be formed on the periphery of a tapping screw, and the coating layer can express its potential adhesive function at a desired timing corresponding to generation of shavings during formation of a female thread. Thus, the coating layer exhibits further improved effect of capturing female-thread-forming chips.

No particular limitation is imposed on the type of the surfactant employed in the present invention, so long as it can uniformly disperse calcium montanate and the thermoplastic resin emulsion in water, to thereby prepare a uniform aqueous dispersion. Examples of the surfactant include an anionic surfactant, a cationic surfactant, an amphoteric surfactant, and a nonionic surfactant.

In the coated tapping screw of the present invention, the coating layer of virtually uniform thickness is formed on the entirety of the shank, which is a male threaded portion, of the screw, and on the entirety of the head of the screw, which is united with the shank. Therefore, as described above in detail, when the tapping screw is screwed into a workpiece, the tapping screw effectively exhibits a lubricating function, as well as a function of capturing female-thread-forming chips. In addition, the coating layer formed on the tapping screw can reduce friction coefficient during screwing, and can reduce variation in friction coefficient, to thereby attain a consistent, low screwing torque during formation of a female thread. Furthermore, since the coating layer is formed on a seating surface of a collar of the tapping screw, after seating of the collar seating surface onto a target part, variation in axial force generated by a set torque can be considerably reduced.

A tapping screw having thereon a coating layer formed from a pigment-containing coating agent is advantageous in that, the difference in color between the coating layer and the material of the tapping screw facilitates visually distinguishing the tapping screw from a tapping screw having no such a coating layer.

According to the method for forming a coating layer on a tapping screw of the present invention, numerous tapping screws can be subjected to a coating treatment at one time without using any special jig, since the coating agent employed in the method has low viscosity, and a coating layer is formed on the entire peripheral surface of each tapping screw. Therefore, according to the coating method, a coating layer can be formed on each tapping screw in an economically advantageous manner. In addition, according to the coating method, a coating layer having such a small thickness that can secure screw accuracy can be formed on a male threaded portion having a small diameter, and poor operation of screwing a small-diameter tapping screw into a workpiece can be prevented.

BEST MODES FOR CARRYING OUT THE INVENTION

Figure 1:
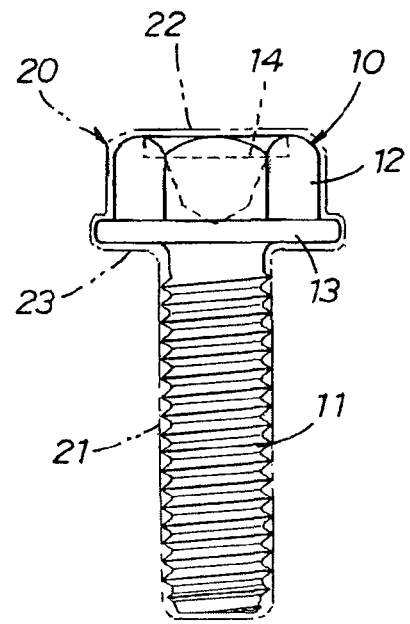
FIG. 1 is a schematic side view of the coated tapping screw of the present invention.

The present invention relates to a tapping screw coating agent; to a method for forming a coating layer on a tapping screw by use of the coating agent; and to a tapping screw having thereon a coating layer formed from the coating agent.

The tapping screw coating agent of the present invention is a composition containing, as primary components, calcium montanate or a calcium-montanate-containing montanic acid species mixture; i.e., calcium montanate, a mixture of calcium montanate and a montanic acid ester, or a calcium salt produced from a mixture of montanic acid and a montanic acid ester (these species will be collectively referred to as "calcium montanate"), a thermoplastic resin emulsion, and water. The coating agent preferably contains an excess surfactant. In the coating agent, the amount of calcium montanate is 3 to 20 wt. %, and the amount of the thermoplastic resin emulsion is 1 to 10 wt. % as a solid content. The thermoplastic resin emulsion preferably contains a resin having a glass transition point of 50° C. or lower.

Montanic acid is a trivial name for a straight-chain fatty acid predominantly containing a C28 fatty acid, or a C28 fatty acid and a C24-C34 fatty acid. Calcium montanate exhibits a lubricating function. Calcium montanate, which is a component of the coating agent of the present invention, exhibits strong waxy characteristics and excellent adhesion to the surface of a metallic member, as compared with calcium stearate, which is generally employed as a lubricant.

Thus, since the coating agent employs calcium montanate as a component, the amount of the below-described thermoplastic resin emulsion, which is employed as a binder for bonding calcium montanate to the peripheral surface of a tapping screw, can be considerably reduced, as compared with the case where a generally employed lubricant is incorporated into the coating agent. Therefore, the coating agent, which contains calcium montanate as a component, can form a thin coating layer on the entire peripheral surface of a tapping screw. Next will be described the reason why the coating agent of the present invention employs calcium montanate as a component exhibiting a lubricating function.

Montanic acid is a straight-chain fatty acid predominantly containing a C28 fatty acid and containing a C24-C34 fatty acid. Examples of similar fatty acids and waxes thereof include carnauba wax, beeswax, and melissic acid. Of these, melissic acid, which has a long carbon chain (30 carbon atoms), is considered to exhibit a function similar to that of montanic acid. However, since melissic acid is a rare fatty acid which is known to be present only in apple skin, the fatty acid is expensive, and, at present, use of the fatty acid is limited to a drug product. Therefore, employment of such an expensive fatty acid as a component of the coating agent is economically very disadvantageous.

Carnauba wax or beeswax contains cerotic acid (C26) as a primary component. However, carnauba wax or beeswax contains a free fatty acid in a small amount. Carnauba wax contains cerotic acid in the form of an ester with myricyl alcohol, whereas beeswax contains a large amount of myricyl palmitate. Therefore, employment of carnauba wax or beeswax as a component of the coating agent results in an increase in cost, as compared with the case of employment of montanic acid.

In contrast, montanic acid can be easily extracted from brown coal with a solvent, and has been commercially available in the form of montanic acid wax, montanic acid ester wax, or partially saponified montanic acid ester wax. Therefore, montanic acid or a montanic acid ester is inexpensive and readily available. Employment of such an inexpensive, readily available fatty acid as a component of the coating agent is economically very advantageous.

In the present invention, calcium montanate, which is employed as a component of the coating agent, may be calcium montanate alone. Alternatively, calcium montanate employed in the coating agent may be a mixture of calcium montanate and a montanic acid ester, or a calcium salt produced from a mixture of montanic acid and a montanic acid ester. The reason why such a mixture-form calcium montanate may be employed is that it is functionally comparable to calcium montanate alone, and is readily available (i.e., commercially available in the form of, for example, montanic acid wax or montanic acid ester wax).

The thermoplastic resin emulsion, which is a component of the coating agent of the present invention, serves as a binder for bonding calcium montanate which is an effective coating component to the peripheral surface of a tapping screw. The thermoplastic resin emulsion also functions so as to hold shavings generated during formation of a female thread. Therefore, the resin contained in the emulsion must have excellent capturing performance and adhesion. No particular limitation is imposed on the type of the resin, so long as the resin exhibits both these properties.

However, the resin is preferably a thermoplastic resin having a glass transition point of 50° C. or lower. By using the thermoplastic resin, a coating layer formed from the coating agent is prevented from melting in an atmosphere at about 80° C., and can ensure the function of capturing shavings generated during formation of a female thread. In addition, when a tapping screw having the coating layer is employed for mounting parts on a workpiece, thereby producing a device, the coating layer is prevented from melting, which would otherwise be cased by high temperature during mounting, and also prevented from falling from the tapping screw. In this regard, the resin employed in the coating agent is preferably an acrylic resin.

The tapping screw coating agent of the present invention is a composition containing, as primary components, calcium montanate, a thermoplastic resin emulsion, and water. In the coating agent, the amount of calcium montanate is 3 to 20 wt. %, and the amount of the thermoplastic resin emulsion is 1 to 10 wt. % as a solid content. When the coating agent contains an excess surfactant serving as a leveling agent, the excess surfactant content of the coating agent is 0.4 to 2 wt. %, and the total surfactant content of the coating agent is 1 to 9 wt. %.

Calcium montanate, which is a component of the coating agent of the present invention, functions so that a coating layer formed from the coating agent exhibits lubricity. As compared with a generally employed lubricant (e.g., calcium soap), calcium montanate exhibits strong waxy characteristics and excellent adhesion to the surface of a metallic member. Therefore, employment of calcium montanate, which serves as a lubricant, can considerably reduce the amount of the thermoplastic resin emulsion employed, which serves as a binder for attaining strong adhesion of a coating layer to the entire peripheral surface of a tapping screw.

The thermoplastic resin emulsion, which serves as a binder, contributes to formability of a coating layer, but impairs the lubricating function of calcium montanate. Therefore, from the viewpoint of such a negative contribution, preferably, the amount of the thermoplastic resin emulsion, which is employed as a component of the coating agent, is reduced to the smallest possible extent. In order to cope therewith, the present invention employs calcium montanate, which exhibits strong waxy characteristics and excellent adhesion to the surface of a metallic member. Thus, the coating agent of the present invention can form a coating layer which has a thickness as small as 1 to 6 μm, and which is strongly bonded to the peripheral surface of a tapping screw. In order to form such an effective coating layer, and in consideration of the lubricating function of the coating layer and the effect of the layer in capturing female-thread-forming chips, the amount of calcium montanate is regulated to 3 to 20 wt. %, and the amount of the thermoplastic resin emulsion is regulated to 1 to 10 wt. % as a solid content.

The coating agent of the present invention preferably contains, as a component, a pigment which assumes an appropriate color. No particular limitation is imposed on the type of the pigment employed, so long as the color of a coating layer formed on the peripheral surface of a tapping screw applied by the pigment-containing coating agent can be visually distinguished from the color of the material of the tapping screw.

The coating agent of the present invention may be prepared through any known method. Basically, the coating agent is prepared through the following procedure: montanic acid or a mixture of montanic acid and a montanic acid ester (hereinafter the mixture may be referred to as a "montanic acid species mixture") is saponified with calcium hydroxide, to thereby prepare calcium montanate or a calcium salt of the montanic acid species mixture; and the thus-prepared calcium montanate or calcium salt of the montanic acid species mixture and a thermoplastic resin emulsion are uniformly dispersed in water by use of a surfactant.

Preferably, the coating agent is prepared so that the amounts of the respective components are as follows: calcium montanate or a calcium salt of a montanic acid species mixture: 3 to 20 wt. %, a thermoplastic resin emulsion: 1 to 10 wt. % (as a solid content), a surfactant: 1 to 9 wt. %, and water: balance. Preparation of the thermoplastic resin emulsion and dispersion of calcium montanate in water require a surfactant in an amount of 0.6 to 7 wt. %. Preferably, an excess surfactant (0.4 to 2 wt. %) is not used for such dispersion but used as a leveling agent for enabling the coating agent to be uniformly applied.

The coating agent of the present invention is basically prepared through the aforementioned method. For the sake of convenience of preparation, a commercially available lubricant (e.g., montanic acid wax or montanic acid ester wax) is employed as calcium montanate (i.e., calcium montanate or a mixture of calcium montanate and a montanic acid ester). For preparation of the coating agent of the present invention, any of the following commercially available lubricants may be employed as calcium montanate.

Examples of commercially available montanic-acid-containing lubricants include "Wax OP (registered trademark)" and "Wax O (registered trademark)" (products of Clariant GmbH) and "Wax OP (registered trademark)" (product of BASF). Such a lubricant is a mixture of Ca soap of montanic acid and a dihydric alcohol ester having a high degree of esterification. For example, such a mixture contains a 1,2-ethanediol and/or 1,3-butanediol ester having a degree of esterification of 90% or more. The Ca soap content of the mixture is about 45 wt. %, which corresponds to a Ca content of about 1.5 wt. %.

When a coating layer is formed on the periphery of a tapping screw by use of the coating agent of the present invention, advantageously, the coating method of the present invention is employed. In the coating method of the present invention, numerous tapping screws contained in an immersion container are immersed at one time in a coating agent having a temperature adjusted to 10 to 30° C. and a viscosity adjusted to 3 to 13 mPa·S (at 25° C.); subsequently, an excessive amount of the coating agent deposited on each tapping screw is removed after completion of immersion; and finally, the coating agent deposited on each tapping screw is dried, to thereby form a coating layer on the entire periphery of the tapping screw.

In the coating agent of the present invention, which is employed for forming a coating layer on a tapping screw, the amount of the thermoplastic resin emulsion, which serves as a binder, can be reduced, since calcium montanate, which is a component of the coating agent, exhibits excellent properties contributing to formation of a coating layer. Therefore, the viscosity of the coating agent can be reduced. According to the coating method of the present invention, which employs the coating agent of low viscosity, a coating layer can be formed on a tapping screw so that a cruciform recess (drive recess) provided in the head of the screw, into which the tip end of a screwdriver fits, is not filled with the coating agent. Therefore, the coating method of the present invention can form a coating layer on the entire peripheral surface of a tapping screw. Thus, the coating method exhibits the below-described effects intrinsic to the method, and realizes production of an excellent tapping screw as described below.

A conventional coating agent has high viscosity. Thus, when the conventional coating agent is employed for forming a coating layer on a tapping screw, the region on which a coating layer is formed is limited to only the shank, which is a male threaded portion, of the tapping screw, at least where a coating layer must be formed. In order to form a coating layer only on a tapping screw shank by use of a conventional coating agent, a single tapping screw is held by means of a special, exclusive jig, and only the shank of the thus-held tapping screw is immersed in the coating agent, to thereby form a coating layer on the peripheral surface of the shank.

In contrast, according to the coating method of the present invention, a coating layer can be formed on the entire peripheral surface of a tapping screw without causing any problem, since the coating agent employed in the method has low viscosity. Therefore, numerous tapping screws contained in an immersion container can be immersed at one time in the coating agent, and coating layers can be formed on the peripheries of the numerous tapping screws at one time without using special exclusive jig. Thus, according to the coating method of the present invention, a coating layer can be formed on each tapping screw in an economically advantageous manner. In addition, according to the coating method, a coating layer having such a small thickness can secure screw accuracy, and it is possible to form the coating layer on a male threaded portion having a small diameter. Further, poor operation of screwing a small-diameter tapping screw into a workpiece can be prevented.

The tapping screw of the present invention has thereon a coating layer formed from the coating agent of the present invention. The tapping screw has a coating layer of virtually uniform thickness on the entire peripheral surface of the shank, which is a male threaded portion, of the screw, and on the entire peripheral surface of the head of the screw, which is united with the shank. The coating layer exhibits a lubricating function during screwing of the tapping screw, and a function of capturing female-thread-forming chips generated through screwing of the tapping screw. FIG. 1 schematically shows a tapping screw 10 according to an embodiment of the present invention.

Figure 2:
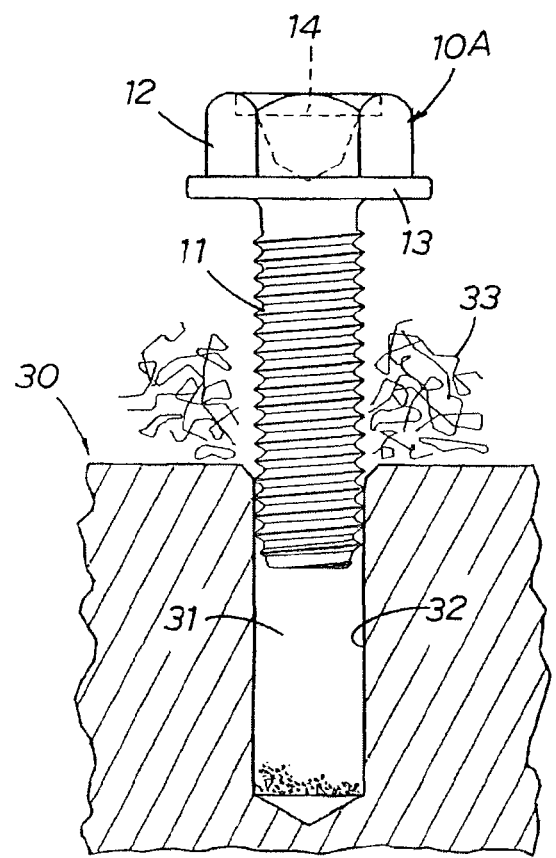
FIG. 2 is a side view of the state where a conventional tapping screw is being screwed into a prepared hole provided in a workpiece.

The tapping screw 10 includes a shank (male threaded portion) 11; a head 12 which is united with the shank 11; and a collar 13 formed at the boundary between the shank 11 and the head 12. The head 12 has, on the top surface thereof, a cross recess (a drive recess 14) into which the tip end of a screwdriver fits. The tapping screw 10 has, on the entire peripheral surface thereof, a coating layer 20 formed from the coating agent of the present invention. The coating layer 20 is schematically shown by a two-dot chain line. The coating layer 20 consists of a first coating layer portion 21 formed on the entire peripheral surface of the shank 11; a second coating layer portion 22 formed on the entire peripheral surface of the head 12; and a third coating layer portion 23 formed on the entire peripheral surface of the collar 13. Preferably, the coating layer 20 assumes a color different from that of the material of the tapping screw 10, and the coating layer 20 has a thickness of 1 to 6 µm. FIG. 2 schematically shows a common tapping screw 10A and a mode of use thereof.

When a non-illustrated screwdriver fitted into a drive recess 14 formed in the top of a head 12 of the tapping screw 10A is rotated, the tapping screw 10A is screwed into a prepared hole 31 provided in a workpiece 30, to thereby form a female thread on the inner wall of the prepared hole 31; i.e., the tapping screw 10A taps a female thread in the prepared hole 31. Thus, a target part is fastened and mounted on the workpiece 30 so as to be sandwiched between the surface of the workpiece 30 and the seating surface of the collar 13 of the tapping screw 10A. When the tapping screw 10A is screwed into the prepared hole 31 by means of its rotation to form a female thread on the inner wall 32 of the prepared hole 31, female-thread-forming chips 33 are generated. The female-thread-forming chips 33 continuously generate as the female thread is formed until screwing of the tapping screw 10A is stopped. The thus-generated female-thread-forming chips 33 are scattered on the workpiece 30.

In contrast, the tapping screw 10 of the present invention has, on the entire peripheral surface thereof, the coating layer 20 exhibiting a lubrication function and a function of capturing the female-thread-forming chips 33. Therefore, by virtue of the lubricating function of the first coating layer portion 21, the tapping screw 10 is smoothly screwed into the prepared hole 31 by means of a virtually constant operational force, to thereby form a female thread on the inner wall of the prepared hole 31. In addition, the female-thread-forming chips 33 generated during formation of the female thread are held in the coating layer portion by its adhesive function that is expressed by means of pressure and heat applied thereto during formation of the female thread, whereby scattering of the female-thread-forming chips 33 on the workpiece 30 is prevented.

Since the coating layer 20 formed on the tapping screw 10 has small thickness and high adhesion strength, no removal or peeling of the coating layer from the shank 11 (i.e., male threaded portion) of the tapping screw 10 occurs until completion of screwing of the tapping screw 10 into the prepared hole. In addition, the coating layer 20 exhibits a proper lubricating function during screwing of the tapping screw 10, and also exhibits a proper function of capturing the female-thread-forming chips 33 through expression of the adhesive function of the coating layer at a desired timing by means of pressure and heat applied thereto during formation of the female thread during screwing.

Thus, by virtue of the lubricating function of the coating layer 20, the tapping screw 10 is screwed into the prepared hole 33 of the workpiece 30 under a low and virtually constant load. Accordingly, screwing of the tapping screw 10 can be smoothly carried out at a low and constant torque.

Further, according to the tapping screw 10, The female-thread-forming chips 33 generated during formation of the female thread by screwing are held, at a desired timing, in the coating layer 20 by its adhesive function that is expressed by means of pressure and heat applied to the coating layer 20 during formation of the female thread. Therefore, scattering of the female-thread-forming chips 33 on mounted parts or the workpiece 30 is reliably prevented. Thus, the coating layer 20 can prevent adverse effects of scattering of the female-thread-forming chips 33 on the mounted parts or the workpiece 30.

At the time when screwing of the tapping screw 10 into the prepared hole 31 of the workpiece 30 is completed, the seating surface of the collar 13, which serves as a partition between the shank 11 and the head 12 of the tapping screw 10, is seated onto a portion of the target part mounted on the surface of the workpiece 30. Since the third coating layer portion 23 constituting the coating layer 20 is formed on the seating surface of the collar 13 of the tapping screw 10, after seating of the collar 13 of the tapping screw 10 onto the target part, variation in axial force generated at a set torque can be considerably reduced.

Examples and Comparative Examples

In Examples and Comparative Examples, a plurality of coating agents containing calcium montanate as a component were prepared, and coating layers formed from the thus-prepared agents were tested in terms of adhesion strength to a metallic member, tackiness (capturing performance), friction coefficient, and amount of cut dust generated. Table 1 shows components of the thus-prepared coating agents, and the amounts of the components. Table 2 shows the results of tests.

TABLE 1

| | | | (Components) | | | | | | | | |
|---|---|---|---|---|---|---|---|---|---|---|---|
| | | Test | | Component B | | | | | | | Coating layer |
| | | sample | Component A | b1 | b2 | b3 | b4 | Component C | Component D | Component E | thickness |
| Ex. | | 1 | 12.6 | 3.2 | | | | 1.5 | 0.2 | 82.5 | 4.06 |
| | | 2 | 14.4 | | 1.8 | | | 1.5 | 0.2 | 82.1 | 4.03 |
| | | 3 | 15.6 | | | 1.9 | | 1.5 | 0.2 | 80.7 | 4.09 |
| | | 4 | 15.6 | | | | 1.9 | 1.5 | 0.2 | 80.7 | 4.12 |
| | | 5 | 7.6 | 7.6 | | | | 1.5 | 0.2 | 83.1 | 4.01 |

TABLE 1-continued (Components)

| | Test sample | Component A | Component B b1 | b2 | b3 | b4 | Component C | Component D | Component E | Coating layer thickness |
|---|---|---|---|---|---|---|---|---|---|---|
| Comp. Ex. | 6 | | | | 9.6 | | 1.5 | 0.2 | 88.7 | 4.09 |
| | 7 | 8.0 | | | 8.0 | | 1.5 | 0.2 | 82.3 | 4.13 |
| | 8 | 12.0 | | | 3.0 | | 1.5 | 0.2 | 83.3 | 4.03 |

(Note)
Component A: "Wax OP" (registered trademark) . . . calcium montanate (wt. %)
Component B: thermoplastic resin emulsion
Resin component:
b1 . . . acrylic-alkyd resin (no Tg) (wt. %)
b2 . . . acrylic resin (Tg: −5° C.) (wt. %)
b3 . . . acrylic resin (Tg: 6° C.)
b4 . . . acrylic-styrene resin (Tg: 47° C.) (wt. %)
Component C: leveling agent (wt. %) . . . Troysol LAC (registered trademark)
Component D: pigment (wt. %)
Component E: water (containing a surfactant) (wt. %)
Coating layer thickness: (g/m$^2$) . . . 1 g/m$^2$ corresponds to a thickness of 1 μm

TABLE 2

(Properties of coating layer)

| | Test sample | Adhesion (bonding) strength Measured value | Average | Breakage position | Tackiness (Capturing Performance) Pencil hardness | Impact resistance | Friction coefficient/ evaluation | Amount of cut dust generated/ evaluation |
|---|---|---|---|---|---|---|---|---|
| Ex. | 1 | 108/124 | 115.7 | AB/AB | =6B | 10 cm | 0.114/○ | 1.283/X |
| | 2 | 118/137 | 127.5 | AB/AB | =6B | 10 cm | 0.111/○ | 1.088/X |
| | 3 | 333/353 | 343.2 | B/B | ≥6B | 20 cm | 0.114/○ | 0.61/○ |
| | 4 | 294/314 | 304.0 | B/B | ≥6B | 20 cm | 0.110/○ | 0.67/○ |
| | 5 | 167/157 | 161.8 | B/B | =6B | 10 cm | 0.131/X | 1.15/Δ |
| Comp. Ex. | 6 | 108/88 | 98.1 | AB/AB | =6B | 10 cm | 0.155/X | 1.17/X |
| | 7 | 177/196 | 186.3 | AB/B | ≥6B | 10 cm | 0.120/Δ | 0.96/Δ |
| | 8 | 206/216 | 210.8 | AB/B | ≥6B | 10 cm | 0.123/Δ | 1.04/Δ |

(Note)
Bonding strength: unit N/cm$^2$
Breakage position:
AB . . . interfacial breakage
B . . . breakage of cohesion and interfacial breakage between sub-layers in a coating layer
Pencil hardness: evaluation ratings (&H to 6B)
Friction coefficient: evaluation by three ratings (○, Δ, and X).
Amount of cut dust generated: unit mg, evaluation by three ratings (○, Δ, and X).

(1) Preparation of Coating Agent

In the Examples and the Comparative Examples, eight types of coating agents (test samples 1 to 8) were prepared by use of a commercial lubricant ("Wax OP" (registered trademark), product of Clariant GmbH) as calcium montanate, a thermoplastic resin emulsion, a surfactant (serving as a dispersant for dispersing calcium montanate in water, or as a leveling agent), a pigment, and water. The thus-prepared coating agents were subjected to the below-described tests. Components of the thus-prepared coating agents and the amount of the components are shown in Table 1, wherein "component A" represents "Wax OP," "component B (b1, b2, b3, or b4)" a thermoplastic resin emulsion, "component C" a surfactant serving as a leveling agent, "component D" a pigment, and "component E" water containing a surfactant.

"Wax OP" (component A) is a mixture of Ca soap of montanic acid and a dihydric alcohol ester having a high degree of esterification, and contains a 1,2-ethanediol and/or 1,3-butanediol ester having a degree of esterification of 90% or more. The Ca soap content of the mixture is about 45 wt. %, which corresponds to a Ca content of about 1.5 wt. %.

Regarding the thermoplastic resin emulsion (component B), "component b1" represents an emulsion containing an acrylic-alkyd resin (no glass transition point), "component b2" an emulsion containing an acrylic resin (glass transition point: −5° C.), "component b3" an emulsion containing an acrylic resin (glass transition point: 6° C.), and "component b4" an emulsion containing an acrylic-styrene resin (glass transition point: 47° C.). The leveling agent (component C) is Troysol LAC (registered trademark) (product of Troy Chemical Corporation). Water (component E) contains, in an amount of 0.5 wt. %, a surfactant serving as a dispersant for dispersing calcium montanate in water.

"Coating layer thickness" (g/m$^2$) shown in Table 1 is the thickness of a coating layer formed on a test piece subjected to the below-described tests. A coating layer thickness of 1 g/m$^2$ corresponds to about 1 μm.

(2) Measurement of Adhesion Strength

Figure 3:
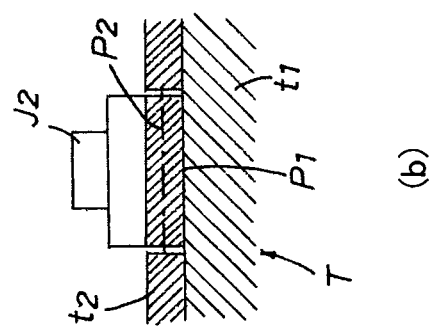
FIG. 3(a) shows a tensile test for measuring the adhesion strength of a coating layer formed from the coating agent of the present invention.
FIG. 3(b) shows breakage positions of the coating layer as determined through the tensile test.
Figure 3:
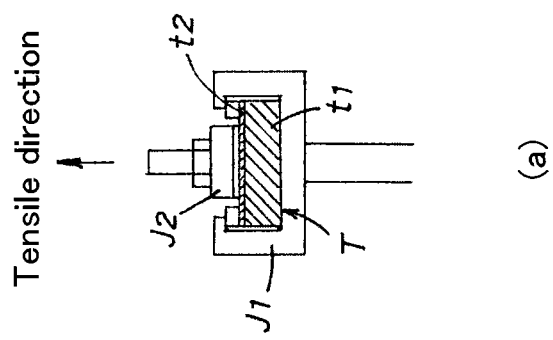

For measurement of adhesion strength, each of the above-prepared coating agents was applied to a surface of a steel plate (substrate), to thereby prepare a test piece having thereon a coating layer, and the test piece was subjected to the tensile bonding strength test method according to JIS K5600-5-7 (see FIG. 3a). The thus-measured bonding strength was regarded as adhesion strength. The unit of bonding strength is "N/cm²." The position of breakage of the coating layer was determined through the breakage position test method according to JIS K5400 (see FIG. 3b).

In the tensile bonding strength test, a test piece T was placed on a lower jig J1 for tensile testing so that the test piece T did not move upward. An upper jig J2 for tensile testing (φ20 mm) was attached, by use of an adhesive, to the surface of a coating layer t2 formed on the top surface of a substrate t1 of the test piece T. A groove was formed in the coating layer t2 along the circumference of the upper jig J2 so as to reach the substrate t1, so that a portion of the coating layer t2 attached to the upper jig J2 was separated from the remaining portion; and then the attached portion of the coating layer t2 was subjected to tensile testing by means of a tensile tester at a tensile rate of 10 mm/min, to thereby measure the bonding strength of the coating layer t2. In the tensile bonding strength test, the position of breakage of the coating layer was determined as shown in FIG. 3(b). Position P1 denotes interfacial breakage between the coating layer t2 and the substrate t1 of the test piece T. Position P2 denotes breakage of cohesion in the coating layer t2 and interfacial breakage between sub-layers in the coating layer t2.

The bonding strength and breakage position as determined through the tensile bonding strength test are shown in the column "Adhesion strength" of Table 2. The tensile bonding strength test was carried out at two sites per a single test piece. These test data are shown in the sub-columns "Measured value" and "Breakage position" of the column "Bonding strength." In each sub-column, test data corresponding the two sites of the test piece are separately listed by a slash (/).

(3) Measurement of Tackiness (Capturing Performance)

For measurement of tackiness which represents capturing performance, a test piece T was prepared so as to have the same configuration as that employed in the aforementioned measurement of adhesion strength. The tackiness of the coating layer t2 of the test piece T was evaluated on the basis of pencil hardness as measured through the pencil hardness test according to JIS K5400 8, 4, 2, and impact resistance as measured through the impact resistance test according to JIS 5600-5-3. Pencil hardness was evaluated by scores (&H to 6B), and the unit of impact value used for evaluation of impact resistance is "cm."

In the pencil hardness test, the surface of the test piece T was scratched by a pencil (hardness: &H to 6B), and the highest value of the pencil hardness at which the coating layer t2 was not damaged was determined. In the impact resistance test, a cover piece (φ63.5 mm) was placed on the test piece T, and a weight (500 g) was dropped onto the cover piece from a height of 10 cm, 20 cm, 30 cm, 40 cm, or 50 cm. Height from which the weight was dropped when cracking or exfoliation occurs at the coating layer t2 is measured as evaluation value of impact resistance. The results of the thus-measured pencil hardness and impact value are respectively shown in the sub-columns "Pencil hardness" and "Impact resistance" of the column "Tackiness (Capturing performance)" of Table 2.

(4) Measurement of Friction Coefficient

For measurement of friction coefficient, a test piece T was prepared so as to have the same configuration as that employed in the aforementioned measurement of adhesion strength. By use of the test piece T, thread friction coefficient and seating surface friction coefficient were calculated through "Method of tightening test for threaded fasteners" according to JIS B1014, and total friction coefficient was calculated as friction coefficient by use of the following formula 1. The thus-calculated friction coefficient was evaluated by three ratings (○, Δ, and x). The results of measurement and evaluation of friction coefficient are shown in the column "Friction coefficient/evaluation" of Table 2.

$$\mu t = (Tf/Ff - 0.16P) \times (2/1.1 d \times d2 + Dw) \tag{F1}$$

(Note: total friction coefficient ($\mu t$)=thread friction coefficient ($\mu s$)=seating surface friction coefficient ($\mu w$))

Tf: tightening torque, Ff: tightening axial force, P: thread pitch, D: nominal screw diameter, Dw: equivalent diameter of friction torque on the seating surface (5) Measurement of Amount of Cut Dust Generated The tapping screw having a coating layer formed from each test sample shown in Table 1 and formed on the entire periphery thereof was screwed into a prepared hole of a workpiece. The thus-generated cut dust (female-thread-forming chips) was completely collected, and the thus-collected cut dust was entirely transferred into a quartz beaker. Subsequently, a mixed acid ($HCl+HNO_3$) was added to the beaker for hydrolysis, and the volume of the mixture was adjusted to 50 mL, to thereby prepare a solution for measurement. The thus-prepared solution was subjected to ICP emission spectrometry for quantitative determination of the amount of cut dust. The thus-measured amount of cut dust was evaluated by three ratings (○, Δ, and x). The results of measurement and evaluation of the amount of cut dust are shown in the column "Amount of cut dust generated/evaluation" of Table 2. The unit of amount of cut dust generated is "mg."

INDUSTRIAL APPLICABILITY

As described above, the coating agent of the present invention can form, on the periphery of a tapping screw, a coating layer which exhibits a lubricating function during formation of a female thread, and a function of capturing female-thread-forming chips. According to the coating method of the present invention, a coating layer exhibiting these functions can be readily formed on the periphery of a tapping screw in an economically advantageous manner. The coated tapping screw of the present invention realizes, through smooth screwing, mounting of various parts on a workpiece, and can prevent scattering of female-thread-forming chips generated during screwing of the tapping screw into the workpiece.

The invention claimed is:

1. A tapping screw coating agent, for forming a lubricant coating layer on the periphery of a tapping screw, characterized in that the coating agent is a composition comprising, as primary components, calcium montanate or a calcium-montanate-containing montanic acid species mixture, a thermoplastic resin emulsion, and water, wherein the amount of calcium montanate or the montanic acid species mixture is 3 to 20 wt. %, and the amount of the thermoplastic resin emulsion is 1 to 10 wt. % as a solid content, wherein the thermoplastic resin emulsion includes an acrylic resin which has a glass transition point of 6 to 50° C.

2. A tapping screw coating agent as described in claim 1, which contains a surfactant in an amount of 1 to 9 wt. %.

3. A tapping screw coating agent as described in claim 1, which contains a pigment in an amount of 0.1 to 0.5 wt. %.

4. A method for forming a lubricant coating layer on the periphery of a tapping screw by use of a tapping screw coating agent, the method comprising the steps of:

providing the tapping screw coating agent, the coating agent being a composition comprising, as primary components, calcium montanate or a calcium-montanate-containing montanic acid species mixture, a thermoplastic resin emulsion, and water, wherein the amount of calcium montanate or the montanic acid species mixture is 3 to 20 wt. %, and the amount of the thermoplastic resin emulsion is 1 to 10 wt. % as a solid content, wherein the thermoplastic resin emulsion includes an acrylic resin which has a glass transition point of 6 to 50° C.;

immersing the tapping screw placed in an immersing container in the lubricant coating agent having a temperature adjusted to 10 to 30° C. and a viscosity adjusted to 3 to 13 mPa·S as determined at 25° C.;

removing an excessive amount of the lubricant coating agent deposited on the tapping screw after completion of immersion; and drying the coating agent deposited on the tapping screw, to thereby form the lubricant coating layer on the periphery of the tapping screw.

5. A tapping screw having thereon a lubricant coating layer formed by applying a tapping screw coating agent to the tapping screw through immersion, the coating agent being a composition comprising, as primary components, calcium montanate or a calcium-montanate-containing montanic acid species mixture, a thermoplastic resin emulsion, and water, wherein the amount of calcium montanate or the montanic acid species mixture is 3 to 20 wt. %, and the amount of the thermoplastic resin emulsion is 1 to 10 wt. % as a solid content, wherein the thermoplastic resin emulsion includes an acrylic resin which has a glass transition point of 6 to 50° C., and characterized in that the tapping screw has the lubricant coating layer of virtually uniform thickness on the entirety of a shank of the tapping screw, which is a male threaded portion, and on the entirety of a head of the tapping screw, which is united with the shank, wherein the lubricant coating layer exhibits a lubricating function during screwing of the tapping screw.

6. A tapping screw as described in claim 5, wherein the lubricant coating layer formed on the entirety of the tapping screw has a thickness of 1 to 6 μm.

7. A tapping screw as described in claim 6, wherein the lubricant coating layer formed on the entirety of the tapping screw assumes a color different from that of the material of the tapping screw.

* * * * *